United States Patent [19]
Ota

[11] Patent Number: 4,809,151
[45] Date of Patent: Feb. 28, 1989

[54] SWITCHING REGULATOR HAVING PARALLEL DIODE ISOLATED PRIMARY WINDINGS AND PLURAL SECONDARY WINDINGS

[75] Inventor: Naoto Ota, Hino, Japan

[73] Assignee: Fanuc Ltd., Yamanashi, Japan

[21] Appl. No.: 124,798

[22] PCT Filed: Feb. 23, 1987

[86] PCT No.: PCT/JP87/00118
§ 371 Date: Oct. 16, 1987
§ 102(e) Date: Oct. 16, 1987

[87] PCT Pub. No.: WO87/05165
PCT Pub. Date: Aug. 27, 1987

[30] Foreign Application Priority Data

Feb. 24, 1986 [JP] Japan .................. 61-037475

[51] Int. Cl.[4] .......................................... H02M 3/335
[52] U.S. Cl. .......................................... 363/21; 363/71
[58] Field of Search .................. 363/20, 21, 67, 71

[56] References Cited

U.S. PATENT DOCUMENTS 3,569,818  3/1971  Dahlinger et al. .................. 363/21
4,322,785  3/1982  Walker .................................. 363/21

FOREIGN PATENT DOCUMENTS 68878   5/1980  Japan .................................. 363/21
162783  10/1983  Japan .................................. 363/21
59-085  4/1984  Japan .................................. 363/21

Primary Examiner—William H. Beha, Jr.
Attorney, Agent, or Firm—Armstrong, Nikaido, Marmelstein & Kubovcik

[57] ABSTRACT

A switching regulator comprising a first diode inserted in series with and in a forward direction to a primary winding of the main power transformer, at least one subsidiary power transformer having a primary winding connected in parallel with the primary winding of the main power transformer, and a second diode inserted in series with and in a forward direction to a primary winding of the at least one subsidiary power transformer, which uses one switching control circuit and one switching means and applies chopped voltages to many transformers simultaneously, and generates many mutually insulated DC power sources, which can be small in size and have simple printed circuits.

2 Claims, 2 Drawing Sheets

4,809,151

SWITCHING REGULATOR HAVING PARALLEL DIODE ISOLATED PRIMARY WINDINGS AND PLURAL SECONDARY WINDINGS

TECHNICAL FIELD

The present invention relates to a switching regulator, more particularly, to a switching regulator for driving a power device using a plurality of mutually insulated DC power sources.

BACKGROUND ART

Conventionally, a switching regulator is used for generating a plurality of mutually insulated DC power sources from one DC power source. For example, a power supply of an inverter device drives an AC servomotor of an automated guided vehicle (AGV) by a battery source, as the power supply, based upon the factors of weight, conversion efficiency, and space occupied.

In this conventional switching regulator, one switching control circuit and one switching transistor are used to generate a chopped voltage. The chopped voltage is applied to one power transformer, and a required DC power source is then generated.

Note, an AC servomotor is generally used as a travelling motor or a lifting motor of the AGV, since it does not require a brush and has maintenance advantages. To drive and control the above AC servomotor, in addition to the main power source for a main control circuit, a driving power source, insulated from the main power source, is required.

This driving power source is a power source for a driver circuit which amplifies a signal from a control circuit and drives high capacity power transistors, so that the AC servomotor is supplied with the controlled power source. The driving power sources are not only insulated from the control circuit, but also insulated from one another. For example, where one AC servomotor is driven by a three phase alternating current, six pairs of mutually insulated driving power sources are required for six driving transistors.

As mentioned above, a conventional switching regulator uses one switching control circuit and one switching transistor, and a chopped voltage is applied to one transformer, so that the power supply generates a required DC power source. Therefore, for example, where one AC servomotor is driven by a three phase alternating current, six pairs of mutually insulated driving power sources are required, and thus many secondary windings for the six pairs of driving power sources must be wound on the one transformer.

When a required number of secondary windings of the driving power sources are wound on one transformer, however, the weight of the transformer is increased and a printed substrate on which the transformer is mounted is liable to be damaged. Furthermore, the number of pins of the transformer is increased and the external form of the transformer becomes large. Additionally, many secondary windings are wound on the one transformer and many connecting pins are concentrated, so that many power lines must be led from the transformer position to other positions supplying the power sources. Further, so many connecting pins of the transformer are fixed on the printed substrate that the printed circuits become complex, and especially when a power source voltage is very high, a distance between the printed circuits must be enlarged to avoid a spark discharge therebetween. Consequently, the printed substrate must be enlarged and it is difficult to improve a packing density of the device.

SUMMARY OF THE INVENTION

The object of the present invention is to provide a switching regulator using one switching control circuit and one switching means and applying chopped voltages to many transformers simultaneously, and generating many mutually insulated DC power sources, which is small in size and has simple printed circuits.

According to the present invention, there is provided a switching regulator comprising: a power supply device; a switching device; a main power transformer, a primary winding of the main power transformer being connected to said power supply device via the switching device; a switching control circuit for detecting a voltage of one secondary winding of the main power transformer and controlling a duty ratio of the switching device; a first diode inserted in series with and in a forward direction to a primary winding of the main power transformer; at least one subsidiary power transformer, a primary winding of the subsidiary power transformer being connected in parallel with the primary winding of the main power transformer; and a second diode inserted in series with and in a forward direction to a primary winding of the at least one subsidiary power transformer.

The switching regulator of the present invention uses one switching control circuit and one switching means and applies chopped voltages to many transformers simultaneously, and generates many mutually insulated DC power sources. That is, according to the switching regulator of the present invention, the one transformer having many windings is divided into many small transformers, so that the weight on the printed substrate is divided and the space occupied by the printed substrate on which the transformers are mounted, in decreased. Furthermore, the printed circuits are simplified, the printed substrate is miniaturized, and the packing density of the device is improved.

DESCRIPTION OF THE PREFERRED EMBODIMENTS

Figure 1:
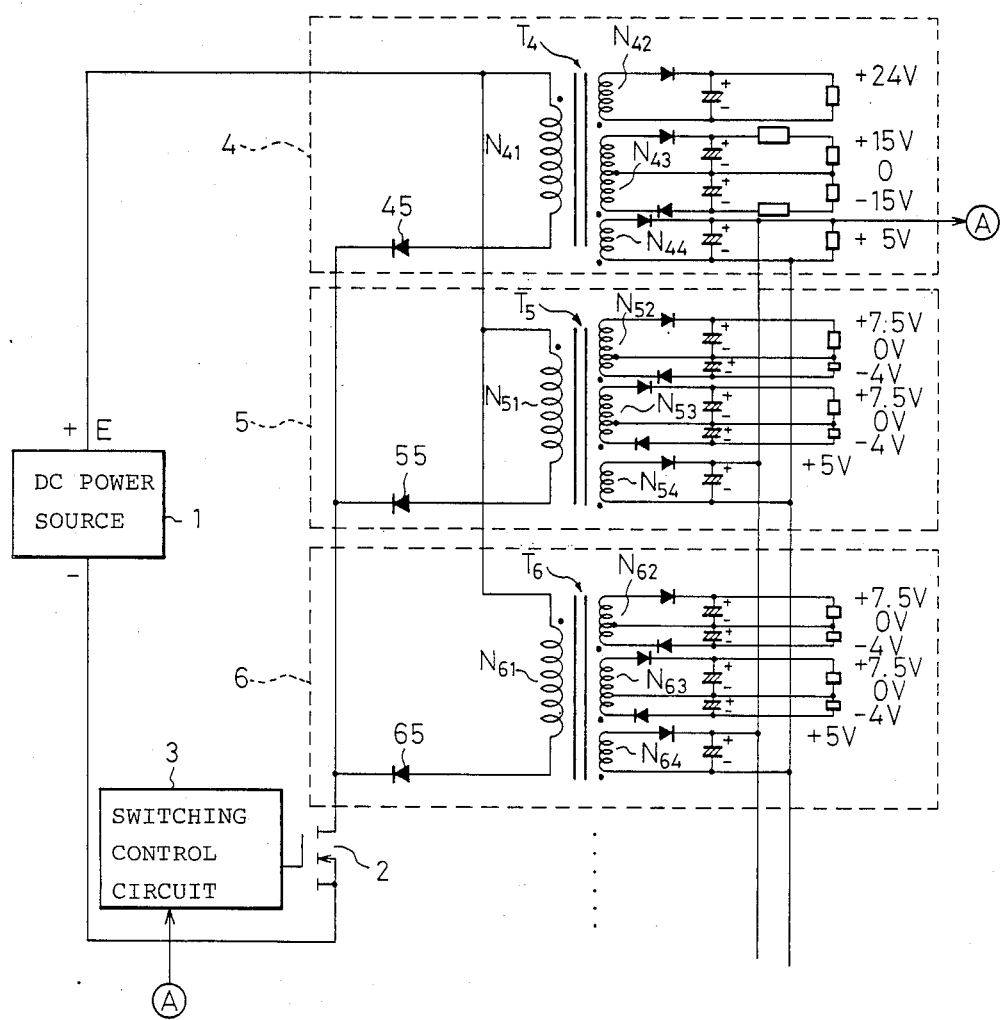
FIG. 1 is a block circuit diagram showing a part of an example of the switching regulator of the present invention.

FIG. 1 is a block circuit diagram showing a part of an example of the switching regulator of the present invention, wherein reference numeral 1 denotes a DC power source, reference numeral 2 denotes a switching transistor, reference numeral 3 denotes a switching control circuit, reference numeral 4 denotes a main power source portion, reference numeral 5 denotes a first driving power source portion, and reference numeral 6 denotes a second driving power source portion.

The DC power source is a battery or an output of a rectifier circuit, the voltage E is applied to a primary winding $N_{41}$ of a transformer (main power transformer) $T_4$ in the main power source portion 4 via the switching transistor 2 and a breaking diode 45, for circulating current, is inserted in series with and in a forward direction to the primary winding $N_{41}$. The voltage E is also applied to a primary winding $N_{51}$ of a transformer (subsidiary power transformer) $T_5$ in the first driving power source portion 5 via the switching transistor 2 and a breaking diode 55, for circulating current, inserted in series with and in a forward direction to the primary winding $N_{51}$. Furthermore, the voltage E is also applied to a primary winding $N_{61}$ of a transformer (subsidiary power transformer) $T_6$ in the second driving power source portion 6 via the switching transistor 2 and a breaking diode 65, for circulating current, inserted in series with and in a forward direction to the primary winding $N_{61}$. In this way, the voltage E is applied to many driving power source portions. For example, where three AC servomotors are driven by a three phase alternating current, nine power source portions are provided in parallel. Further, the switching control circuit 3 controls a ratio (duty ratio) between a switching ON time and a period of the switching transistor 2 by making use of pulse width modulation (PWM). This switching transistor 2 is driven by a high speed period, for example, a period of 40 KHz, and therefore, a MOS type FET can be used as the switching transistor 2 to enable a high speed operation.

In the secondary side of the transformer $T_4$ in the main power source portion 4, there are provided secondary windings $N_{42}$, $N_{43}$ and a secondary winding $N_{44}$ for a controlled system power source. Each secondary winding generates a required DC power source respectively by a rectifier diode and a smoothing condenser connected to each secondary winding. Concretely, for example, the secondary winding $N_{42}$ supplies DC 24 Volts for use in an interface, the secondary winding $N_{43}$ supplies DC ±15 Volts for use in an analog differential amplifier, and the secondary winding $N_{44}$ supplies DC 5 Volts for use in a main power source of a speed control circuit in need of a high capacity. A part of an output of the secondary winding $N_{44}$ for use in the main power source returns to the switching control circuit 3 and controls a driving signal of the switching transistor 2 in order to control the output voltage to a constant voltage.

In the secondary side of the transformer $T_5$ in the first driving power source portion 5, there are provided secondary windings $N_{52}$, $N_{53}$ and a regulating winding $N_{54}$ of the controlled system power source, a rectifier diode and a smoothing condenser is connected to each of these windings. Each winding generates a required DC power source respectively. Concretely, for example, the secondary windings $N_{52}$ and $N_{53}$ supply DC 7.5 Volts and DC-4 Volts for use in one driving transistor, respectively. Where an AC servomotor is driven by a three phase alternating current, for example, three driving power source portions are required by one AC servomotor, since two driving transistors are used as one phase of the three phase alternating current. Therefore, where three AC servomotors are driven by a three phase alternating current, nine driving power source portions are provided in parallel with the power supply in order to drive a power device.

Further, in the secondary side of the transformer $T_5$ in the first driving power source portion 5, there is provided the regulating winding $N_{54}$, and the number of turns of the regulating winding $N_{54}$ is determined as an output voltage of the regulating winding $N_{54}$, as for an output of the secondary winding $N_{44}$ for the controlled system power source. A rectifier diode and a smoothing condenser is connected to the regulating winding $N_{54}$, and the output voltage of the regulating winding $N_{54}$ is applied to the output of the secondary winding $N_{44}$ for the controlled system power source. Consequently, each output voltage of the secondary windings $N_{52}$ and $N_{53}$ in the first driving power source portion 5 is a constant voltage. When loads connected to these secondary windings $N_{52}$ and $N_{53}$ have a low value, then the energy of the transformer $T_5$ is transferred through from the regulating winding $N_{54}$ to the output of the secondary winding $N_{44}$ for the controlled system power source.

The second driving power source portion 6 is the same as the first driving power source portion 5, and in the secondary side of the transformer $T_6$, there are provided secondary windings $N_{62}$, $N_{63}$ and a regulating winding $N_{64}$, so that constant voltages of DC power sources are generated by each winding. When loads of the secondary windings $N_{62}$, $N_{63}$ have a low value, then the energy of the transformer $T_6$ is transferred through from the regulating winding $N_{64}$ to the output of the secondary winding $N_{44}$. Such a driving power source portion is not only for the first driving power source portion 5 and the second driving power source portion 6, but also for many driving power source portions (for example, nine portions) connected in parallel therewith, as described above.

These driving power source portions are fixed on a printed substrate close to the driving transistor. The printed circuits required by each driving power source portions can be simplified by only connecting the primary windings and the regulating winding to each transformer, so that the printed substrate per se can be miniaturized. Since the one large transformer is divided into many small transformers, the number of connecting pins of each divided transformer is decreased. Consequently, the divided transformers can be miniaturized and the weight of the printed substrate on which the divided transformers are fixed can be spread. Furthermore, chopped voltages generated by one switching control circuit 3 and one switching transistor 2 are applied to many transformers, and thus there is an advantage in a decrease of the cost of the power supply.

Figure 2:
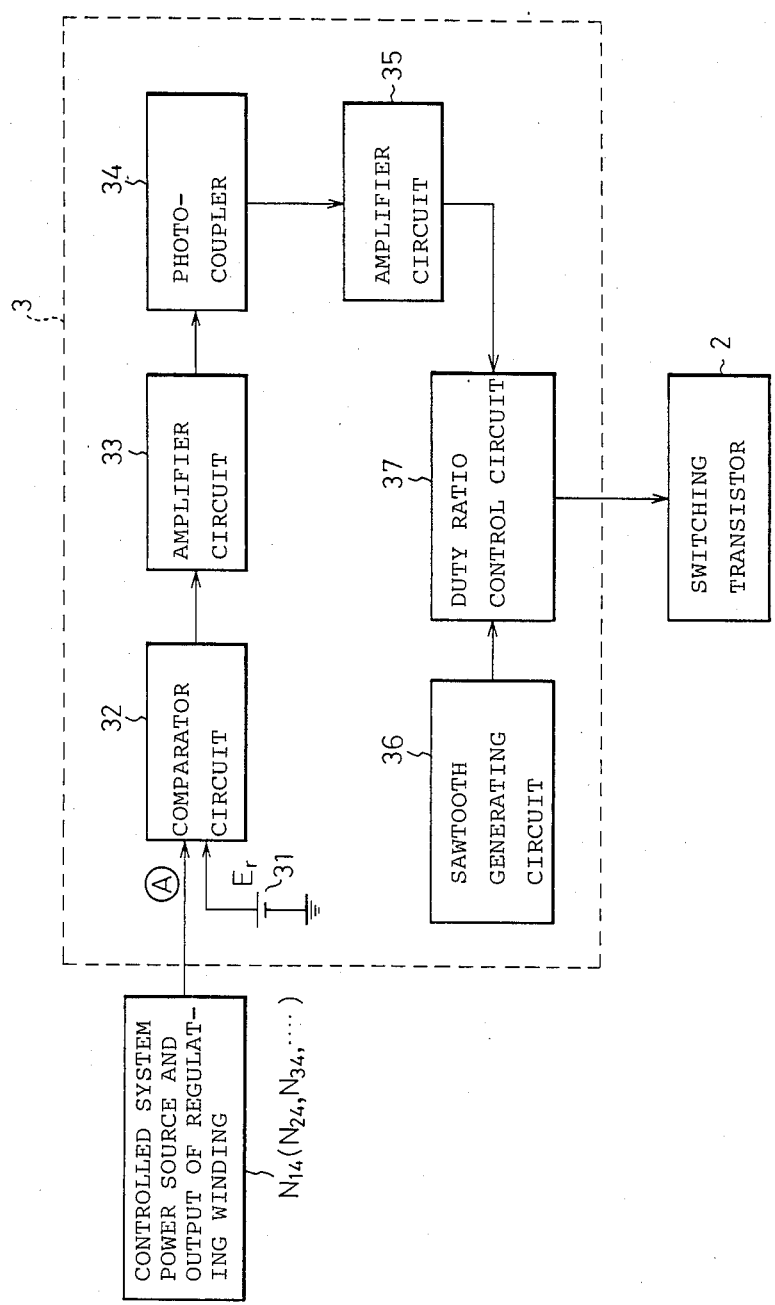
FIG. 2 is a block diagram showing a switching control circuit.

FIG. 2 is a block diagram showing a switching control circuit.

The controlled system power source (the output of the secondary winding $N_{44}$ for the controlled system power source) of the main power source portion 5, and the output (power source A) of the regulating winding $N_{54}$ of the main power source portion and the output of the regulating winding $N_{64}$ of the second driving power source portion 6 are returned to the switching control circuit 3. Next, the power source A (for example, DC 5 Volts) is compared with a voltage $E_r$ (for example, DC 5 Volts of a constant-voltage) of a reference power source 31 in a comparator circuit 32. An output of the comparator circuit 32 is amplified by an amplifier circuit 33 and transferred to a photo-coupler 34. This photo-coupler 34 is used for floating the output of the amplifier circuit 33, and the output of the photocoupler 34 is amplified by an amplifier circuit 35 and is transferred to a duty ratio control circuit 37 as an input signal. The duty ratio control circuit 37 generates a prescribed pulse width signal which is determined by a constant period sawtooth wave signal generated by a sawtooth generating circuit 36 and by an output of the amplifier circuit 35, so that the ratio (duty ratio) between a switching ON time and a period of the switching transistor 2 is determined by the output signal of the duty ratio control circuit 37.

Next, an operation of the example of the switching regulator of the present invention is described below.

First, when the switching transistor 2 is switched ON by the driving signal of the switching control circuit 3, then the voltage E of the DC power source 1 is applied to the primary winding $N_{41}$ of the transformer $T_4$ through a breaking diode for controlling a circulating current 45, to the primary winding $N_{51}$ of the transformer $T_5$ through a breaking diode for controlling a circulating current 55, and to the primary winding $N_{61}$ of the transformer $T_6$ through a breaking diode for controlling a circulating current 65 respectively. Therefore, in the secondary windings $N_{42}$, $N_{43}$ and the secondary winding $N_{44}$ for the controlled system power source of the transformer $T_4$, the secondary windings $N_{52}$, $N_{53}$ and the regulating winding $N_{54}$ of the transformer $T_5$, and the secondary windings $N_{62}$, $N_{63}$ and the regulating winding $N_{64}$ of the transformer $T_6$, an induced voltage is provided in each winding respectively at the side marked with a dot "●". But electrical conduction does not occur, since each rectifier diode is inserted in a reverse direction. In this condition, an electric power is not transferred to each output side of the windings, but the energy is stored in the transformers $T_4$, $T_5$ and $T_6$.

After a constant period, the switching transistor 2 is switched OFF, then the polarity of the voltages applied to the transformers $T_4$, $T_5$ and $T_6$ is inverted, and electrical conduction occurs in the rectifier diodes of the secondary windings $N_{42}$, $N_{43}$ and the secondary winding $N_{44}$ for controlled system power source of the transformer $T_4$, in the rectifier diodes of the secondary windings $N_{52}$, $N_{53}$ and the regulating winding $N_{54}$ of the transformer $T_5$, and in the rectifier diodes of the secondary windings $N_{62}$, $N_{63}$ and the regulating winding $N_{64}$ of the transformer $T_6$, so that the energy stored in the tranformers $T_4$, $T_5$ and $T_6$ is transferred to the smoothing condenser and to the output of each winding respectively. In the primary winding $N_{41}$ of the transformer $T_4$, the primary winding $N_{51}$ of the transformer $T_5$ and the primary winding $N_{61}$ of the transformer $T_6$, the breaking diodes 45, 55 and 65 are provided for circulating current in a forward direction with the DC power source 1 (the direction is the reverse of the direction current flow when the switching transistor 2 is cut off), therefore the energy stored in the transformers $T_4$, $T_5$ and $T_6$ is not transferred to the primary windings $N_{41}$, $N_{51}$ and $N_{61}$ respectively.

In this way, in the main power source portion 4, the first driving power source portion 5 and the second driving power source portion 6, the required DC power sources can be given in accordance with the number of turns of each secondary winding.

Note, as in the above description, the power source a returned to the switching control circuit 3 is not only connected to the output of the secondary winding $N_{44}$ for controlled system power source in the main power source 4, but also to the output of the regulating winding $N_{54}$ in the first driving power source portion 5 and to the output of the regulating winding $N_{64}$ in the second driving power source portion 6. Consequently, the outputs of the secondary windings $N_{52}$, $N_{53}$ of the transformer $T_5$ and the secondary windings $N_{62}$, $N_{63}$ of the transformer $T_6$ can be stabilized, and the secondary windings $N_{42}$, $N_{43}$ of the transformer $T_4$ also can be stabilized. Furthermore, when the power consumption of the first driving power source portion 5 or the second driving power source portion 6 is low, the excessive energy in the regulating winding $N_{54}$ of the transformer $T_5$ or the regulating winding $N_{64}$ of the transformer $T_6$ is transferred to the secondary winding $N_{44}$ for controlling the system power source respectively.

In accordance with the present invention as described above, the switching regulator of the present invention uses one switching control circuit and one switching means and applies chopped voltages many transformers simultaneously, and generates many mutually insulated DC power sources. Therefore, the transformers can be small size and the printed circuit can be simplified, the space occupied by the printed substrate on which the transformers are fixed can be reduced and miniaturized, and furthermore, there is an advantage of a decreased in the cost of the power supply.

I claim:
1. A switching regulator comprising:
   a power supply means;
   a switching means;
   a main power transformer having a primary winding and a plurality of secondary windings, said primary winding of said main power transformer being connected to said power supply means via said switching means;
   a switching control circuit for detecting a voltage of one of said plurality of secondary windings of said main power transformer and controlling a duty ratio of said switching means;
   a first diode inserted in series with and in a forward direction to said primary winding of said main power transformer;
   at least one subsidiary power transformer having a primary windings, a plurality of secondary windings and a regulating winding, said primary winding of said subsidiary power transformer being connected in parallel with said primary winding of said main power transformer; and
   a second diode inserted in series with and in a forward direction to said primary winding of said at least one subsidiary power transformer;
   said regulating winding of said at least one subsidiary power transformer being connected to said one of said plurality of secondary windings of said main power transformer.

2. A switching regulator according to claim 1, wherein said switching regulator is used for driving a power device.

* * * * *